(12) United States Patent
Kobayashi et al.

(10) Patent No.: US 7,486,497 B2
(45) Date of Patent: Feb. 3, 2009

(54) ELECTRODE FOR ELECTRIC DOUBLE LAYER CAPACITOR, METHOD FOR MANUFACTURING SAME, ELECTRIC DOUBLE LAYER CAPACITOR, AND CONDUCTIVE ADHESIVE

(75) Inventors: Kotaro Kobayashi, Okayama (JP); Kazuhiro Miniami, Okayama (JP); Shin-ichi Tachozono, Tako-machi (JP)

(73) Assignees: Japan Gore-Tex, Inc., Tokyo (JP); Hitachi Powder Metals Co., Ltd, Chiba (JP)

( * ) Notice: Subject to any disclaimer, the term of this patent is extended or adjusted under 35 U.S.C. 154(b) by 0 days.

(21) Appl. No.: 10/575,344

(22) PCT Filed: Oct. 8, 2004

(86) PCT No.: PCT/JP2004/015296

§ 371 (c)(1),
(2), (4) Date: Mar. 20, 2007

(87) PCT Pub. No.: WO2005/036574

PCT Pub. Date: Apr. 21, 2005

(65) Prior Publication Data

US 2007/0177332 A1    Aug. 2, 2007

(30) Foreign Application Priority Data

Oct. 10, 2003    (JP)    ............... 2003-352766

(51) Int. Cl.
*H01G 9/058*    (2006.01)
(52) U.S. Cl. ........................ 361/502; 29/25.03
(58) Field of Classification Search ................ 361/305, 361/502; 29/25.03
See application file for complete search history.

(56) References Cited

U.S. PATENT DOCUMENTS 4,862,328 A * 8/1989 Morimoto et al. ........... 361/502

(Continued)

FOREIGN PATENT DOCUMENTS

JP    7-216330    8/1995

(Continued)

OTHER PUBLICATIONS

Machine Translation of JP 11-162787.*

(Continued)

*Primary Examiner*—Eric Thomas
*Assistant Examiner*—David M Sinclair
(74) *Attorney, Agent, or Firm*—Allan M. Wheatcraft

(57) ABSTRACT

The present invention is an electrode for electric double layer capacitors wherein a polarizable porous sheet composed of constituent materials including a carbonaceous electric double layer-forming material, a carbon material for ensuring conductivity, and a binder is integrated to at least one surface of a collector via a conductive intermediate layer; and is characterized in that the conductive intermediate layer contains a synthetic rubber and two more kinds of carbon materials having different particle diameters. According to the present invention, the electrode can be readily manufactured in a continuous manner with high heat resistant adhesion between the polarizable porous sheet and the collector and a low internal resistance; and when used in an electric double layer capacitor, it is possible to obtain an electrode capable of ensuring a higher capacity and lower internal resistance than is conventionally achieved.

15 Claims, 3 Drawing Sheets

U.S. PATENT DOCUMENTS

| | | | |
|---|---|---|---|
| 5,766,753 A * | 6/1998 | Murata et al. | 428/323 |
| 6,021,039 A * | 2/2000 | Inagawa | 361/502 |
| 6,359,769 B1 * | 3/2002 | Mushiake et al. | 361/502 |
| 6,475,670 B1 * | 11/2002 | Ito | 429/217 |
| 2004/0128813 A1 | 7/2004 | Murakami et al. | 29/25.03 |
| 2004/0130038 A1 | 7/2004 | Murakami et al. | 257/783 |

FOREIGN PATENT DOCUMENTS

| | | |
|---|---|---|
| JP | 11-317333 | 11/1995 |
| JP | 10-4037 | 1/1998 |
| JP | 11-154630 A | 6/1999 |
| JP | 11-162787 | 6/1999 |
| JP | 2001-307966 | 11/2001 |
| JP | 2004-296863 | 10/2004 |

OTHER PUBLICATIONS

Machine Translation of JP 2001-307966.*

Dow Reichhold Specialty Latex LLC, Adhesives/Packaging, Oct. 03, 2003.*

* cited by examiner

Positive electrode terminal
Negative electrode terminal

PRIOR ART

ELECTRODE FOR ELECTRIC DOUBLE LAYER CAPACITOR, METHOD FOR MANUFACTURING SAME, ELECTRIC DOUBLE LAYER CAPACITOR, AND CONDUCTIVE ADHESIVE

FIELD OF THE INVENTION

The present invention relates to an integrated-collector polar electrode used in electric double layer capacitors, an electric double layer capacitor that employs this electrode, and a conductive adhesive that is suitable for this electrode.

BACKGROUND OF THE INVENTION

In the past, known types of capacitors that have been used as electric double-layer capacitors (electric double layer condensers) have included capacitors in which a separator is interposed between a pair of polar electrodes, which are then sealed with a gasket and a metal case along with electrolyte (coin or button-type capacitors); capacitors wherein an electric double-layer capacitor unit is produced by layering and winding long electrode sheets and separators, with the unit being housed in a metal case, impregnated with electrolyte, and sealed (wound-type capacitors); and capacitors in which a long electrode thin film and separator are alternately layered to form an electrode laminate, and connections are made whereby positive electrode leads are connected to the positive electrode terminals of the electrodes and negative electrode leads are connected to the negative electrode terminals, thus producing an electric double layer capacitor unit which is housed in a metal case, impregnated with electrolyte, and sealed (stacked-type).

With electric double layer capacitors that are used in situations where power is a concern, such as in electric automobiles, it is necessary to reduce internal resistance and raise electric capacity per unit surface area, thus producing high-energy density and high power density. In order to attain these requirements, investigations have been carried out concerning reducing electrode thickness and increasing the surface area of the electrode, which involves increasing the opposing surface area of the electrode. Such requirements are merely in addition to those regarding mass production of electric double layer capacitors.

In order to reduce the thickness of electrodes, thereby increasing electrode surface area, electrodes in the form of a sheet or thin film can be produced by a method such as (1) affixing a mixture in the form of a paste or ink containing electrode material to a collector by means of coating, followed by drying (solvent removal) and rolling; or (2) preparing an electrode sheet consisting of an electrode material in advance, superposing the collector on this electrode sheet surface, and then integrating the materials with a press roll. However, increasing the electrode density and capacity is difficult with the method described in (1), and the method described in (2) is generally not used.

With the manufacturing method according to (2) above, in order to reduce the internal resistance in the electric double layer capacitor, it is important to increase contact and integration between electrode material and collector. Thus, it is generally the case that the electrode material is produced by blending an adhesive with activated charcoal (carbonaceous electric double layer forming material), acetylene black, or other conductive carbon-based powder particles. FIG. 7 shows an example of this type of electrode 10''. An electrode sheet 2 constituted by carbon particles and adhesive is a porous layer having holes 3, with an uneven surface. In this case, when a meal sheet or metal foil with a smooth surface is used as the collector 1, there are point contacts at the interface between the collector 1 and electrode sheet 2, which substantially decreases the contact surface area. This causes a deterioration in the electric double layer capacitor characteristics as a result of an increase in electric resistance due to an increase in the void regions 4 (or liquid phase regions when electrolyte has been introduced) that are interposed between the collector 1 and electrode sheet 2.

Examples of polar electrodes with which these problems can be resolved include the polar electrode provided in JP (Kokai) 11-154630, wherein a porous electrode sheet (polarizable porous sheet) and collector are laminated with a conductive intermediate layer interposed therebetween, and part of this conductive intermediate layer extends into the porous region of this electrode sheet.

The polar electrode disclosed in JP (Kokai) 11-154630 has lower internal resistance than conventional electrodes, and electric double layer capacitors produced using this electrode have exceptional electric capacity and lower internal resistance relative to conventional electric double layer capacitors. This electrode also has exceptional capacity for mass production.

However, with conventional electric double layer capacitors, when moisture is adsorbed on the electrode, the adsorbed moisture undergoes electrolysis when the capacitor is used, and this phenomenon causes loss of capacitor performance.

Thus, electrodes for electric double layer capacitors are subjected to a drying treatment prior to use in capacitors, but in order to more thoroughly prevent loss of performance in electric double layer capacitors while also increasing electric double layer capacitor productivity, it is desirable to completely remove the moisture in the electrode in a short period of time. Consequently, a demand has existed for drying processes that are carried out at higher temperatures.

The present invention was developed in view of the foregoing, and it is an object thereof to provide an electrode that has high heat-resistant adhesion between the collector and polarizable porous sheet, can withstand higher drying treatment temperatures, has low internal resistance, is easy to produce continuously, and can ensure high electric capacity and low internal resistance when used in electric double layer capacitors; a method for manufacturing same; an electric double layer capacitor that employs this electrode; and a conductive adhesive that is suitable for use in the electrode.

SUMMARY OF THE INVENTION

The main point of the electrode for electric double layer capacitors of the present invention with which the above objective is achieved pertains to an electrode wherein a polarizable porous sheet composed of constituent elements including a carbonaceous electric double layer forming material (e.g., activated charcoal), a carbon material for ensuring conductivity, and a binder is integrated via a conductive intermediate layer on at least one surface of a collector, with the conductive intermediate layer containing synthetic rubber and two or more types of carbon material with different particle diameters. The term "sheet" in this specification generally includes so-called "films."

The above electrode preferably contains lead and/or carbon black in the form of a thin sheet as the carbon material that is present in the conductive intermediate layer.

The above synthetic rubber that constitutes the above conductive intermediate layer is preferably a styrene-butadiene rubber, and it is additionally preferable for the styrene-butadiene rubber to have a glass transition temperature of −5 to 30° C.

The above conductive intermediate layer is a material formed using the conductive adhesive containing the above carbon material, synthetic rubber and dispersion medium. The total carbon material content is 3 to 30 mass % in the conductive adhesive, but it is recommended that the content of the synthetic rubber be 7 mass % or less in the conductive adhesive.

The polarizable porous sheet is a porous body, and preferably has an average pore diameter of 0.1 to 5 μm and a porosity of 40 to 90%. The above collector preferably is a material that is constituted by aluminum, and it is recommended that the collector have a surface that has been subjected to a surface roughening treatment.

The electric double layer capacitor electrode of the present invention can be produced by applying a conductive adhesive (C) consisting of a dispersion medium, two or more types of carbon materials with different particle diameters, and a synthetic rubber to the joining surface of a polarizable porous sheet (A) composed of constituent materials including a carbonaceous electric double layer forming material (e.g., activated charcoal), a carbon material for ensuring conductivity, and a binder and/or collector (B); and, prior to drying this dispersion medium, affixing the collector and the polarizable porous sheet and compressing them, thus causing regions of the non-volatile component of the conductive adhesive to be pressed into the holes of the polarizable porous sheet.

In addition, electric double layer capacitors that have the electric double layer capacitor electrode of the present invention as well as the above conductive adhesive used for forming the conductive intermediate layer are also within the scope of the present invention.

DETAILED DESCRIPTION OF THE INVENTION

Figure 1:
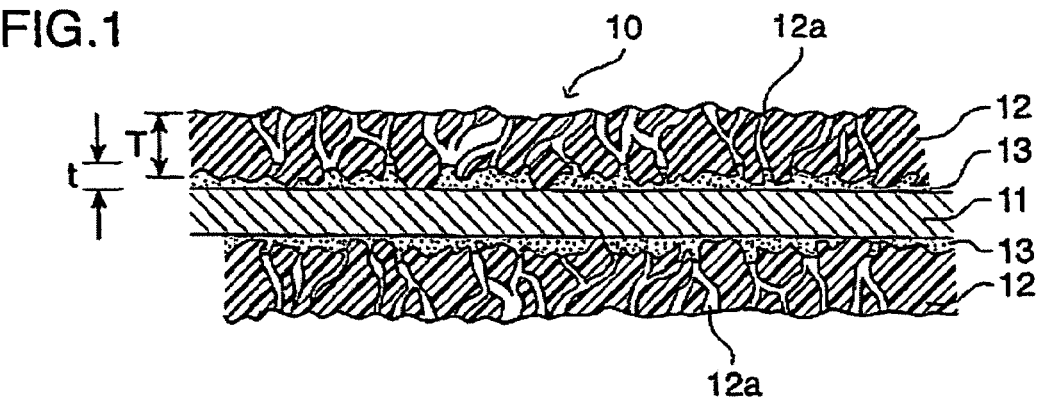
FIG. 1 is a partially enlarged cross-sectional schematic diagram showing an example of the electric double layer capacitor of the present invention.

FIG. 1 shows an embodiment of the electrode for electric double layer capacitors of the present invention (referred to below simply as "electrode"). The electrode 10 has polarizable porous sheets 12, 12 composed of a constituent material including a carbonaceous electric double layer forming material (referred to below simply as "electric double layer forming material"), a carbon material for ensuring conductivity, and a binder affixed via conductive intermediate layers 13, 13 to both surfaces of a collector 11. As shown in FIG. 1, the polarizable porous sheet 12, 12 composed of the above constituent materials is porous, and thus some of the conductive intermediate layer 13 enters into the holes 12a, 12a thereof.

With electrodes for electric double layer capacitors as described above, it is necessary to carry out a drying treatment to remove adsorbed moisture in order to prevent degradation in performance when used in electric double layer capacitors. However, it is preferable for the drying treatment be carried out at as high a temperature as possible and in a short period of time.

For example, with polar electrodes described in JP (Kokai) 11-154630, it is appropriate to use water glass, a cellulose derivative such as carboxymethylcellulose, or a thermoplastic resin such as polyvinyl alcohol in order to affix the collector and the electrode sheet (polarizable porous sheet) that constitute the electrode (specifically, the binder that constitutes the above conductive intermediate layer).

However, when a thermoplastic resin such as polyvinyl alcohol or the above cellulose derivative has been used, it has been necessary to keep the above drying treatment temperature to about 150° C. or below. If the drying treatment is carried out at temperatures that are higher than this range, the adhesive properties between the polarizable porous sheet and collector will be compromised, so that it is difficult to completely remove the water content in a short period of time.

On the other hand, water glass has favorable heat resistance (heat-resistant adhesive properties) relative to thermoplastic resins such as polyvinyl alcohol or cellulose derivatives of the type described above, and it is thus possible to maintain adhesive properties between the collector and polarizable porous sheet even when the drying temperature is increased to certain levels. However, it is difficult to completely remove the water content that is contained in the water glass itself, and it is thus obviously not possible to satisfy the demand of a short drying treatment.

With the foregoing in view, the inventors of the present invention focused their attention on synthetic rubbers as binders that are used to bind polarizable porous sheets and collectors for constituting the conductive intermediate layer. By using synthetic rubber, good heat-resistant adhesive properties are ensured, and thus adhesion between the polarizable porous sheet and collector is sufficiently maintained, even when the drying treatment is carried out at high temperatures (e.g., about 230° C.). Consequently, the adsorbed moisture in the electrode can be completely removed in a shorter period of time.

In forming the above conductive intermediate layer, a method is generally used whereby a liquid-form conductive adhesive is produced by dispersing (or partially dissolving) a carbon material for ensuring conductivity and a binder in a dispersion medium, this adhesive is applied, and the dispersion medium is subsequently removed.

Thus, the synthetic rubber that is used as a binder in the conductive adhesive normally is used in a dispersed particulate state when present in the dispersion medium. However, in this case, the amount of synthetic rubber of the binder that is adsorbed onto the carbon black surface is increased when carbon black or another material with a large specific surface area and comparatively small particle diameter is used as the carbon material, and there are cases where sufficient adhesion is not manifested in the form of the conductive intermediate layer.

On the other hand, when platelet-like graphite having a comparatively small surface area and comparatively large particle diameter, for example, is used as a carbon material, sufficient adhesion is ensured because the amount of synthetic rubber adhering to the graphite surface is small. However, with platelet-like graphite, it is difficult for the material to enter into the holes of the polarizable porous sheet because the particle diameter is comparatively large. Consequently, there are cases where it is not possible to sufficiently ensure the effect of reduced internal resistance resulting from the conductive intermediate layer entering into the holes in the polarizable porous sheet.

However, the loss η (energy loss) due to discharge of the electric double layer capacitor is determined by the following formula:

$$\eta = 2CR/t$$

C denotes the capacity of the entire electric double layer capacitor, R denotes the internal resistance of the electric double layer capacitor, and t denotes the charging time. In other words, the energy loss of an electric double layer capacitor is proportional to the internal resistance and capacity, and inversely proportional to the charging time. Thus, for example, if the internal resistance of the electric double layer capacitor is increased by two times, then it is necessary for the charging time to be increased by two times in order to maintain the same energy loss. Recently, it has been necessary to restrict the internal resistance to as low a value as possible due to demands regarding shortening of charging times.

The use of synthetic rubber as a binder for conductive adhesives is well known, but when synthetic rubber has been used as a binder for conductive adhesives used in electric double layer capacitors, the internal resistance of the electric double layer capacitor has been a few times higher than when thermoplastic resin has been used as a binder. Consequently, synthetic rubber is not used as a binder for conductive adhesives used in electric double layer capacitors.

Thus, in the present invention, it was determined that two or more types of carbon materials with different particle diameters would be used along with the synthetic rubber in order to constitute the conductive intermediate layer. When two or more types of carbon material (e.g., 2, 3, or 4 types) having different particle diameters are contained therein, a carbon material that has a particle diameter that allows introduction into the holes of the polarizable porous sheet is present along with a carbon material that is not able to enter into the holes of the polarizable porous sheet, but which has sufficiently large particle diameters in order to allow adhesion to occur between carbon material particles via a small quantity of synthetic rubber particles. Consequently, the present invention was perfected based on the discovery that adoption of this type of structure allowed a high level of heat-resistant adhesion to be attained, while also ensuring low internal resistance at the same level as with the polar electrode disclosed in JP (Kokai) 11-154630.

<Conductive Intermediate Layer and Conductive Adhesive>

The polarizable porous sheet used in the electrode of the present invention is a porous body of the type described above. With the electrode of the present invention, some of the conductive intermediate layer containing at least two types of carbon material and synthetic rubber enters into the holes of the polarizable porous sheet. Consequently, an improvement in joining strength occurs due to an anchoring effect, and the internal resistance is also decreased.

The above synthetic rubber plays the role of a binder in the conductive intermediate layer. Specific examples of synthetic rubbers include isoprene-based rubbers such as isoprene rubber (polyisoprene); butadiene-based rubbers such as butadiene rubber (syn-1,4-polybutadiene) or styrene-butadiene rubber (SBR); diene-based specialty rubbers such as nitrile rubber (NBR) or chloroprene rubber; olefin-based rubbers such as ethylene-propylene rubber, ethylene-propylene-diene rubber or acrylic rubber; hydrin rubbers; urethane rubbers; and fluorine rubbers.

Among the above synthetic rubbers, SBR is preferred and can be obtained inexpensively in various types of products. Moreover, materials with glass transition temperatures (Tg) of −5° C. to 30° C. are preferred for the SBR. When an SBR having this Tg level is used, it is possible to ensure good binding properties and heat-resistant adhesive properties. In addition, when activated charcoal is used as the electric double layer forming material in the polarizable porous sheet, the numerous fine pores present therein provide a large surface area, so that the surface area of the polarizable porous sheet is increased, thereby contributing to an increase in electric capacity per unit surface area in the electrode. However, by using SBRs having Tg values in the above range, it is possible to prevent the SBR from blocking the fine pores present in the aforementioned activated charcoal, so that loss of electrode characteristics resulting from blockage of the fine pores can be prevented.

Specifically, although binding properties will improve if the Tg of the SBR is below the above range, the fine pores of the activated charcoal in the polarizable porous sheet will tend to become blocked, which will tend to decrease the electric capacity. If the Tg value of the SBR is higher than the above range, on the other hand, then the fluidity of the SBR will decrease, which will tend to compromise the binding properties. It is additionally desirable for the Tg of the SBR to be 0° C. to 10° C. The Tg of the SBR is a value that is measured according to JIS K 7121.

The Tg of the SBR can be controlled, in general, by adjusting the copolymerization ratio between the styrene and butadiene. Specifically, the Tg decreases as the butadiene ratio increases, whereas the Tg tends to increase as the styrene ratio increases. In addition, the heat-resistant adhesive properties improve with increasing styrene ratio, but it has been found that the coating film will be hard and have poor flexibility if the ratio is too high.

The aforementioned conductive intermediate layer is formed from liquid conductive adhesive comprising the carbon material described below, the synthetic rubber described above, and a dispersion medium. There are no particular restrictions on the dispersion medium, but water or lower alcohols (e.g., methanol, ethanol, n-propanol or isopropanol) are preferred. Normally, the synthetic rubber cannot be dissolved or dispersed in these dispersion media without modification, and so well-known surfactants, water-soluble polymers for forming protective colloids, or the like can be added. The conductive intermediate layer forming components referred to above denotes components in the conductive adhesive excluding the volatile content such as a dispersion medium which is not involved in adhesion between the collector and polarizable porous sheet (specifically, the nonvolatile content).

In addition, of the above synthetic rubbers, it is desirable to use latex because latex is easy to procure. For example, SBR, NBR, and other such latexes are common. In such cases, the dispersion medium of the conductive adhesive may be a material that is entirely derived from the latex, or a special dispersion medium may be added.

When using this type of latex, it is preferable for the latex rubber particles to have average particle diameters of 50 to 300 nm. When a latex is used that contains rubber particles having such particle diameters, and when, for example, the conductive adhesive is produced using a carbon material containing material having a particle diameter like that of the carbon black described below (e.g., acetylene black) and material having a particle diameter like that of the platelet-like graphite described below, the small-diameter carbon material will readily enter into the holes of the polarizable porous sheet having the pore diameter described below along with the synthetic rubber particles when the adhesive is used to bond the collector and the polarizable porous sheet. Consequently, a material with exceptional anchoring effects and internal resistance reduction effects of the type described above is produced.

The above carbon material is one that ensures conductivity, and two or more types of material with different particle diameters should be used. Specific examples of carbon materials include graphite having high conductivity resulting from the presence of delocalized π-bonding; spherical aggregate carbon black that forms random-layer structures by the accumulation of multiple layers of graphite carbon microcrystals (e.g., acetylene black, Ketjen black, furnace black, channel black and thermal lamp black); and pyrolized graphite produced by gas-phase pyrolysis of hydrocarbons such as methane, propane, or acetylene, and the deposition thereof in the form of thin film onto a black sheet serving as a substrate. Among these materials, platelet-like graphite (specifically, natural graphite (scale-like graphite)) is preferred because it can ensure high conductivity, and acetylene black is preferred because it has a comparatively small particle diameter and also comparatively good conductivity. Thus, a particularly preferred mode for the above carbon material is a mixture of scale-like graphite and acetylene black.

A description is presented below regarding the acetylene black and platelet-like graphite used as carbon material. The average particle diameter of the acetylene black (primary particle diameter) is normally about 10 to 50 nm. In addition, it is preferable for the average particle diameter of the platelet-like graphite to be 0.5 to 20 μm, with 1 to 10 μm being additionally preferred. By providing a structure in which platelet-like graphite and acetylene black having the average particle diameters hereinabove described are present together in the conductive intermediate layer, the conductivity of the conductive intermediate layer itself will increase, and part of the conductive intermediate layer will enter into the holes in the polarizable porous sheet described below, thereby ensuring exceptional joining strength and internal resistance reduction effects.

The use of a scale-like graphite and carbon black such as acetylene black as carbon materials can be confirmed because a crystalline diffraction curve profile based on the scale-like graphite and a non-crystalline diffraction curve profile based on the carbon black will be observed in the diffraction intensity curves resulting from x-ray diffractometry carried out on the exposed surface produced when the conductive intermediate layer is exposed by stripping the collector or polarizable porous sheet from the electrode.

The mixing ratio of acetylene black and scale-like graphite is preferably 1:10 to 1:1 based on weight ratio, with 1:5 to 1:2 being preferred. With such a mixing ratio, it is possible to ensure sufficient adhesive properties and high internal resistance reduction effects simultaneously.

The average particle diameter of the scale-like graphite is a value that is measured by a laser particle size distribution measurement device ("SALD-2000", manufactured by Shimadzu Ltd.). In addition, the acetylene black having an average particle diameter in the above range may be selected based on the nominal values of the acetylene black manufacturer.

These carbon materials preferably have an ash content of 0.05% or less, regardless of type. When an electrode produced using a carbon material having a low ash content of this type is used in electric double layer capacitors, the life of the capacitor can be extended.

The entire amount in the conductive adhesive is preferably 3 to 30 mass %, and more preferably 10 to 25 mass %. If the amount of carbon material is below this range, then the conductivity of the conductive intermediate layer will be insufficient. If the amount exceeds the above range, on the other hand, then the weight balance of the binder (synthetic rubber referred to above) for forming the conductive intermediate layer will break down, and adhesion will tend to decrease.

In addition, the amount of synthetic rubber in the above conductive adhesive is preferably 7 mass % or less, and more preferably 5 mass % or less. If the synthetic rubber exceeds the above range, then there will be instances where the internal resistance increases. It is preferable for the amount of synthetic rubber in the conductive adhesive to be 0.5 mass % or greater from the standpoint of ensuring sufficient adhesion with the conductive intermediate layer, and an amount of 2 mass % or greater is additionally preferred.

In addition, by using a constitution in which two or more conductive materials with different particle diameters are contained in the conductive adhesive of the present invention, the large-diameter carbon material (e.g., scale-like graphite) will be present, together with small-diameter carbon material (e.g., acetylene black or other carbon black), in the holes in the polarizable porous sheet as a result of favorable introduction of material therein. It is thus possible to form a conductive intermediate layer with favorable conductivity while reducing the amount of small-diameter carbon material. As a result, it is possible to keep the small-diameter carbon material from covering the surface of the synthetic rubber particles in the dispersion medium, thus ensuring favorable heat-resistant adhesion when the conductive intermediate layer is formed.

Figure 2:
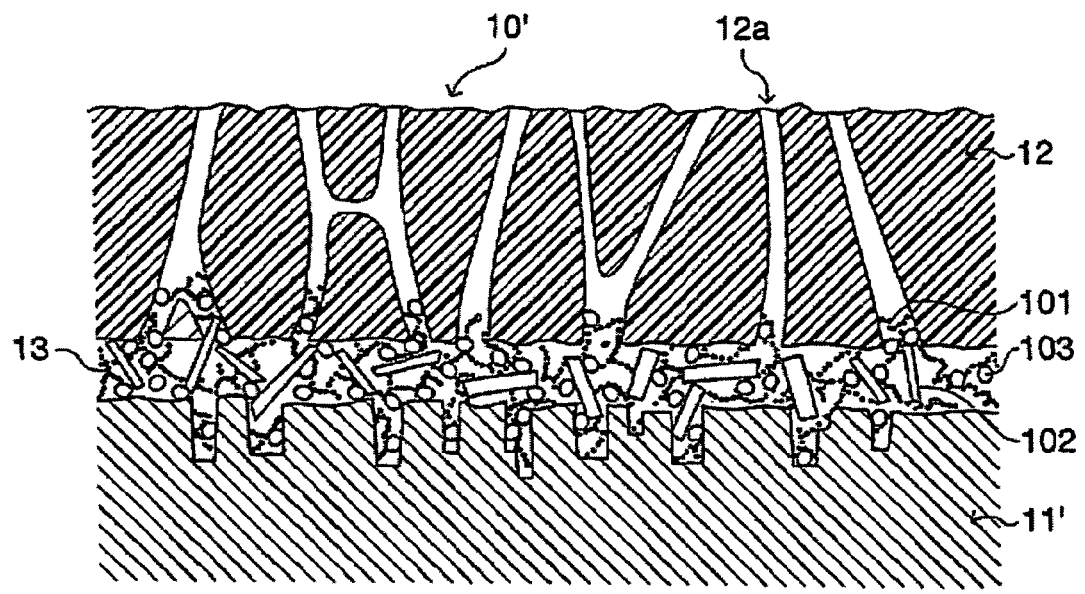
FIG. 2 is a partially enlarged cross-sectional schematic diagram showing another example of the electric double layer capacitor of the present invention.

FIG. 2 shows a schematic view in which a section of the electrode of the present invention has been enlarged. In FIG. 2, 101 indicates a carbon material (carbon black) having a small diameter, 102 indicates a carbon material (scale-like graphite) having a large particle diameter, and 103 indicates synthetic rubber particles. In the electrode 10', some of the small-diameter carbon material 101 and the large-diameter carbon material 102 are bound to the synthetic rubber particles 103 in the conductive intermediately layer 13, and some of the small-diameter carbon material 101 also enters into the holes 12a of the polarizable porous sheet 12 along with the synthetic rubber particles 103. By means of such a constitution, low internal resistance and favorable binding strength, including heat-resistant adhesive properties, are ensured in the electrode of the present invention. In FIG. 2, a mode is presented in which the surface of the collector 11' has been subjected to a surface roughening treatment, and thus some of the small-diameter carbon material 101 enters, along with the synthetic rubber particles 103, into the pits (depressions) formed in the surface of the collector 11', thereby manifesting even better joining strength improvement effects and internal resistance reduction effects.

<Polarizable Porous Sheet>

The polarizable porous sheet is produced by mixing a binder, a carbon material for ensuring conductivity, and other such materials with an electric double layer forming material (carbon electrode material), adding a substance such as ethanol or oil to this mixture to produce a substance that is then pressed, extruded, or otherwise molded with rolls to produce a porous sheet. In other words, a porous sheet is formed in which spaces between the particulate electric double layer forming material become the holes 12a (FIG. 1).

The electric double layer forming material that serves as the raw material for the polarizable porous sheet has no particular restrictions, provided the material is a carbonaceous substance that can form an electric double layer. However, activated charcoal is typically used. Various types of activated charcoal that are commonly used in carbon electrodes may be used as the activated charcoal. Specific examples of substances that may be used are wood charcoal, coconut husk charcoal, lignite, sawdust charcoal and other uncarbonized materials that have been activated with a gas such as water vapor or carbon dioxide, or with a chemical agent such as zinc chloride. The material may be in powdered or particulate form. Because the specific surface area of the activated charcoal is dramatically increased by activation, an electrode with high electric capacity per unit surface area can be formed.

The aforementioned electric double layer forming material may be a microcrystalline carbon such as graphite that is produced by subjecting a carbon material to an activation treatment. This microcrystalline carbon is a material that provides an electric double layer by allowing the introduction of ions or the like between the crystal layers when a voltage is applied. This material can be procured, for example, by means of the technique disclosed in JP (Kokai) 11-317333.

There are no particular restrictions on the carbon material for ensuring conductivity. For example, the various carbon materials indicated as examples for the conductive intermediate layer may be used.

Materials that are well known in the field of electric double layer capacitors may be used as the binder. General examples include fluororesins such as polytetrafluoroethylene (PTFE), polyvinylidene fluoride (PVDF) and ethylene-tetrafluoroethylene copolymer, and cellulose-based resins such as carboxymethylcellulose.

The average pore diameter of the polarizable porous sheet is preferably 0.1 µm to 5 µm, and more preferably 0.5 µm to 3 µm. If the average pore diameter is below the above range, then there will be instances where the conductive intermediate layer forming component will not readily enter into the holes in the polarizable porous sheet. On the other hand, if the value is greater than the above range, there will be instances where the conductive intermediate layer forming component will enter deep into the center of the holes of the polarizable porous sheet, thereby dramatically decreasing the thickness of the conductive intermediate layer that remains interposed between the collector and the polarizable porous sheet and decreasing the joining strength. In addition, when the polarizable porous sheet is constituted by activated charcoal, the fine holes in the activated charcoal will be covered with the conductive intermediate layer forming component, which may hinder capacitor performance. The average pore diameter referred to in this specification is a value that is measured using a mercury porosimeter (Pore Sizer 9310, manufactured by Micrometrics).

The porosity of the polarizable porous sheet is preferably 40% to 90%, and more preferably 60% to 80%. If the porosity is below this range, then there will be instances where a sufficient amount of electrolyte is not retained when the material is used in a capacitor, resulting in an increase in internal resistance. In addition, because the amount of conductive intermediate layer forming components that can enter into the holes of the polarizable porous sheet will decrease, there will be instances where sufficient anchoring effects or internal resistance reduction effects of the type described above cannot be ensured. On the other hand, if the porosity is higher than the above range, then there will be instances where the amount of conductive adhesive will be insufficient, and too many holes will be present into which the conductive intermediate layer has not entered. This will naturally result in insufficient anchoring effects of the type described above. In addition, by interposing an air layer between the collector (that will become a liquid phase when the electrolyte is introduced at the time of use as a capacitor), there will be instances where the above internal resistance reduction effects will not be sufficiently ensured. When the amount of conductive adhesive is too small, on the other hand, the conductive intermediate layer will enter deep into the centers of the holes in the polarizable porous sheet. Consequently, most of the fine holes in the activated charcoal will be covered with this component when the activated charcoal is used in a polarizable porous sheet, thus decreasing the specific surface area of the activated charcoal and potentially causing a reduction in capacitor performance.

The porosity (%) referred to in this specification is a value that is determined as the ratio $(V_O/V) \times 100$ of the hole volume $(V_O)$ with respect to the volume of the polarizable porous sheet as a whole (V). The hole volume can be determined from the following formula by measuring the true density ($\rho$) of the polarizable porous sheet and the weight (W) of the polarizable porous sheet.

$$V_O = V - (W/\rho)$$

The average pore diameter and porosity of the polarizable porous sheet can be adjusted by means of the type of electric double layer forming material that is the constituent material for the polarizable porous sheet, the binder amount, the roll pressure during production of the polarizable porous sheet, and other parameters. The thickness of the polarizable porous sheet is generally 0.05 to 1 mm, and is preferbly 0.08 to 0.5 mm.

The polarizable porous sheet can be produced, for example, by the method described below. Molding aids (e.g., water, alcohol (e.g., methanol and ethanol), and oil (inorganic or other oils)) are added, as necessary, to the electric double layer forming material described above, the carbon material for ensuring conductivity, and the binder. The materials are mixed and then rolled, extruded, or otherwise molded into the form of a sheet, whereupon the molding aid is removed to produce a polarizable porous sheet. For example, when ethanol is used as the molding aid, the mixing ratios with respect to 100 mass parts of the electric double layer forming material are 3 to 15 mass parts of the above carbon material, 5 to 15 mass parts of the binder, and 50 to 300 mass parts of ethanol. Roll extrusion is carried out at a temperature of 50 to 100° C., and a polarizable porous sheet is thus obtained that has the above average pore diameter and porosity.

<Collector>

Although a metal material such as aluminum, titanium, tantalum, nickel, iron, stainless steel, or carbon can be used as the collector, aluminum is particularly preferred because it has exceptional electric conductivity, high stability (does not dissolve/precipitate in electrolyte), and is also inexpensive.

These metals may be used in any form, such as a foil, plate or sheet. Even if the collector, for example, has a smooth surface as shown in FIG. 1, the conductive intermediate layer will enter into the holes 12a of the polarizable porous sheet 12, thereby reducing the interposed air by filling the resulting gap region present at the interface due to point contact between the collector 11 and polarizable porous sheet 12 with the conductive intermediate layer 13. The binding strength thus can be increased by means of the resulting anchoring effect.

An examples of a preferred mode for the collector is one wherein a surface roughening treatment is carried out so that depressions and protrusions are formed at the surface. FIG. 2 shows an example of an electrode having a collector that has been subjected to a surface roughening treatment. With this electrode 10', some of the conductive intermediate layer enters into the pits of the collector 11' as well as the holes 12a of the polarizable porous sheet 12, and thus the binding strength between the polarizable porous sheet 12 and the collector 11' is additionally increased. Of course, the air in the pits is eliminated by means of the conductive intermediate layer forming components that have entered into the pits of the collector 11', so that electrolyte will be interposed in these depressions when the material is used as a capacitor, thereby preventing an increase in electrical resistance.

Figure 3:
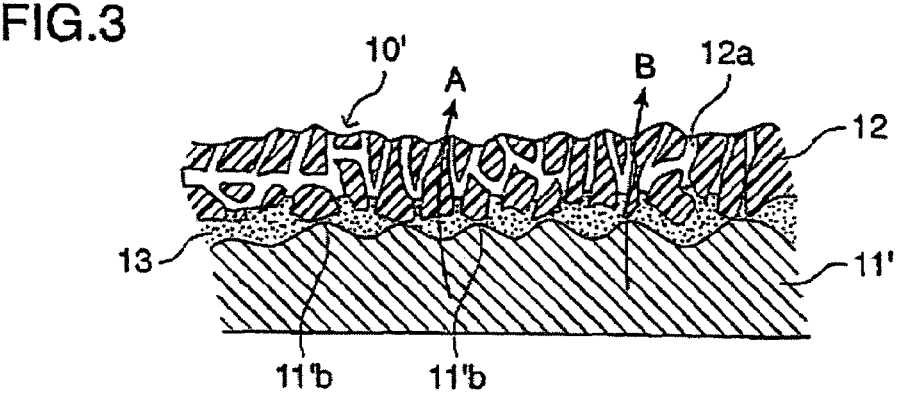
FIG. 3 is a partially enlarged cross-sectional schematic diagram showing yet another example of the electric double layer capacitor of the present invention.

In addition, with electrodes that employ a collector that has been subjected to a surface roughening treatment, it is possible to produce a constitution of the type shown in FIG. 3 by controlling the amount of conductive adhesive used for forming the conductive intermediate layer and the pressure used during lamination of the collector and the polarizable porous sheet.

In the electrode 10' of FIG. 3, although a conductive intermediate layer 13 is interposed on a micro-scale between the collector 11' and the polarizable porous sheet 12, the protrusions 11'b of the collector 11' contact the protrusions of the polarizable porous sheet 12, and the conductive intermediate layer 13 thereby forms a discontinuous layer (in FIG. 3, pits that are formed in the collector 11' are not shown). In such a case, it is possible to reduce the internal resistance further. Specifically, with the electrode having the constitution shown in FIG. 3, two types of paths are formed as conduction paths: a path in which conduction occurs from the collector 11' to the polarizable porous sheet 12 via the conductive intermediate layer 13 (arrow A in FIG. 3) and a path in which conduction occurs directly from the collector 11' to the polarizable porous sheet 12 (arrow B in FIG. 3). The B path has lower electrical resistance than the A path, and thus decreases the electrical resistance of the electrode as a whole, resulting in reduced internal resistance and an electric double layer capacitor that has higher performance.

There are no particular restrictions on surface roughening treatment methods for the collector surface; well-known techniques such as sand blasting and etching (e.g., electrolytic etching and chemical etching) may be used. Among these methods, chemical etching carried out using a chemical agent is preferred because the fine holes or depressions and protrusions that are formed in the collector surface can be readily controlled to produce shapes that are appropriate for the anchoring effects of the adhesive.

The thickness of the collector (prior to the surface roughening treatment, if such a treatment is carried out) is generally 10 to 100 µm, with 20 to 70 µm being additionally preferred.

<Depth at which the Conductive Intermediate Layer Enters into the Holes of the Polarizable Porous Sheet>

(Degree of Ingress)

The recommended depth (degree of ingress) at which the conductive intermediate layer enters into the holes of the polarizable porous sheet, relative to the thickness of the polarizable porous sheet, is 0.15% or greater, and preferably 0.25% or greater; and 15% or less, and preferably 10% or less. If the depth of ingress of the conductive intermediate layer is too small relative to the thickness of the polarizable porous sheet, then improvement in adhesive strength resulting from the anchoring effect may be insufficient, and an increase in internal resistance will occur if air is present between the conductive intermediate layer and the polarizable porous sheet. On the other hand, if the depth of ingress of the conductive intermediate layer is too large relative to the thickness of the polarizable porous sheet, then the proportion of the pores of the activated charcoal that are covered by the conductive intermediate layer forming components will be high if the polarizable porous sheet is constituted by activated charcoal. As a result, the specific surface area of the activated charcoal will decrease, and the characteristics of the capacitor may be compromised.

The degree of ingress referred to above is measured by the method described below.

In a condition in which the electrode is immersed in a solution produced by mixing epoxy resin and hardener, the epoxy resin is allowed to harden, and the electrode that has been solidified with epoxy resin is cut perpendicularly at the desired location (in the thickness direction). This cut surface is polished with sandpaper or alumina powder. Next, the polished section is observed with an optical microscope equipped with a deflector lens, and the ratio of the average distance between the edge of the conducive intermediate layer on the polarizable porous sheet side and the edge of the polarizable porous sheet on the conductive intermediate layer side (t in FIG. 1) with respect to the average thickness of the polarizable porous sheet (T in FIG. 1) is determined as the degree of ingress (t/T×100).

The degree of ingress can be adjusted by means of the average pore diameter of the polarizable porous sheet, the amount of conductive intermediate layer forming components, and the pressure applied when laminating the collector and the polarizable porous sheet.

<Method for Producing Electrodes for Electric Double Layer Capacitors>

First, the above conductive adhesive is applied to the polarizable porous sheet and/or collector surface (joining surface). The coated surface may be either one of the joining surfaces of the polarizable porous sheet or the collector, or adhesive may be applied to both surfaces. It is more preferable to use a method in which the adhesive is applied to the joining surface of the collector. This is because the surface of the polarizable porous sheet can be regarded as a powder aggregate and because open holes are present over the entire surface, the conductive adhesive will penetrate to fairly deep locations in the holes of the porous polar sheet when the conductive adhesive is applied over the joining surface of the polarizable porous sheet. As a result, there will be instances where the degree of ingress described above will exceed the above preferred range. In addition, it is preferable to apply the material to the high-strength collector from the standpoint of productivity (mass production).

The applied amount of conductive adhesive is preferably 2 to 15 $g/m^2$ in terms of the amount after drying (specifically, the amount of conductive intermediate layer forming components), with 3 to 10 $g/m^2$ being additionally preferred.

Next, the polarizable porous sheet and collector are laminated prior to evaporation of the dispersion medium so that the applied conductive adhesive will be interposed therebetween. The lamination method may involve simple overlaying and gluing, but it is preferable to apply pressure and compress the materials after gluing. In the latter case, it is possible to ensure that some of the conductive adhesive will be pressed into the holes of the polarizable porous sheet, while also ensuring more favorable joining. Moreover, because the polarizable porous sheet is compressed and increased in density, the capacity of the polarizable porous sheet can also be increased. There are no particular restrictions on the compression method, but, for example, a method involving passing the material through a pair of rolls is comparatively easy. At this time, the clearance between the rolls with respect to the overall thickness of the laminate is preferably 30 to 90%, with 50 to 70% being additionally preferred. By using this level of clearance, increased polarizable porous sheet capacity can be achieved while also allowing the degree of ingress to be kept to within the above range. If the clearance falls below the above range, then there is a risk of collector deformation and separation of the polarizable porous sheet in conjunction therewith.

Next, the volatile component (e.g., dispersion medium) in the conductive adhesive is removed. The removal method has no particular restrictions, but, for example, a hot air drying method is preferred. The hot air temperature is preferably near the boiling point of the dispersion medium. Because the dispersion medium is removed, the conductive intermediate layer is thereby formed, thus producing the electrode of the present invention as shown in FIGS. 1 to 3. FIG. 2 and FIG. 3 show only one side of the collector.

<Electric Double Layer Capacitor>

Figure 4:
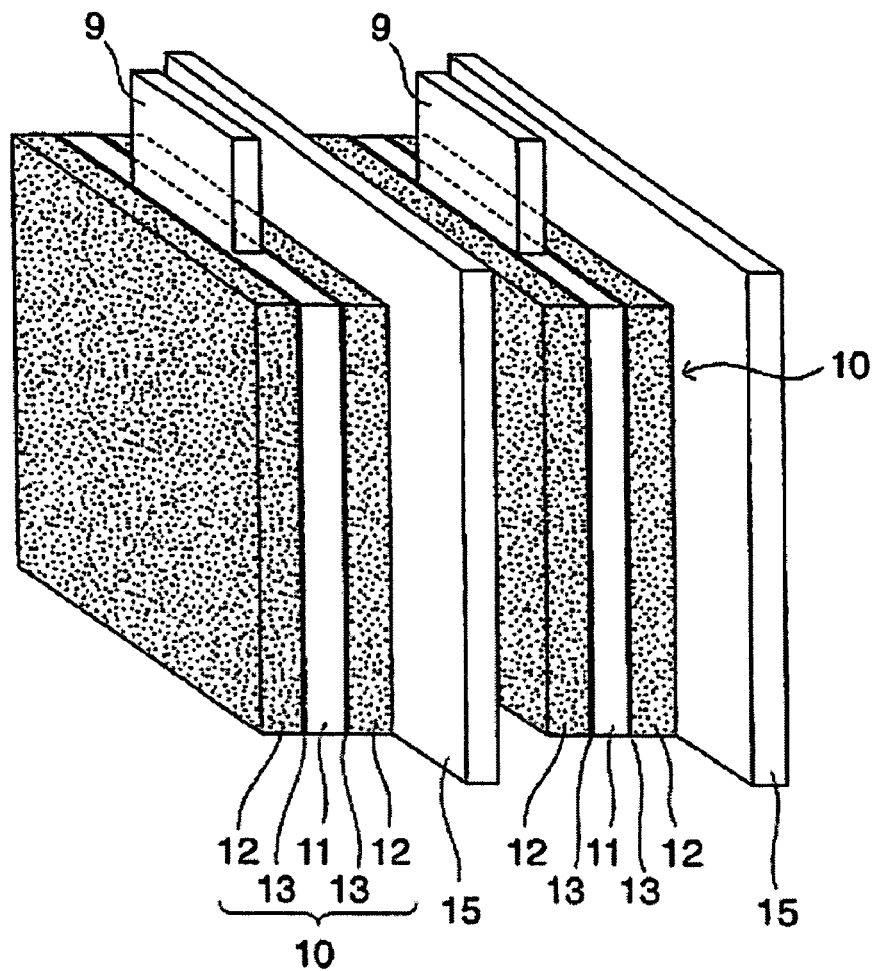
FIG. 4 is a schematic perspective view showing a structure in which the separator and the electrode for electric double layer capacitors are assembled.
Figure 5:
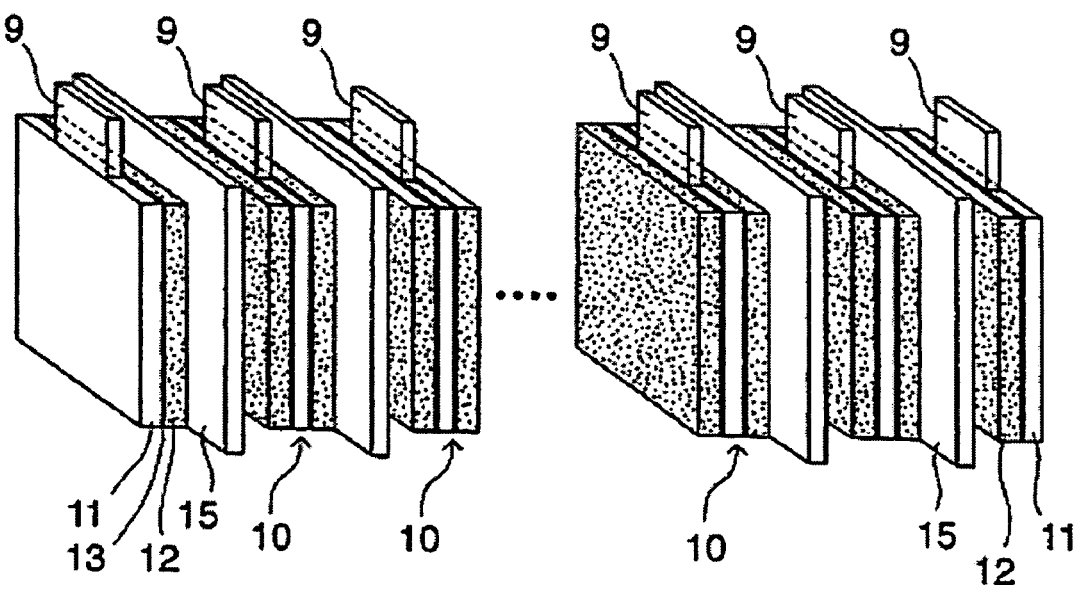
FIG. 5 is a schematic perspective view showing a condition in which multiple constituent elements of an electric double layer capacitor are arranged side by side.
Figure 6:
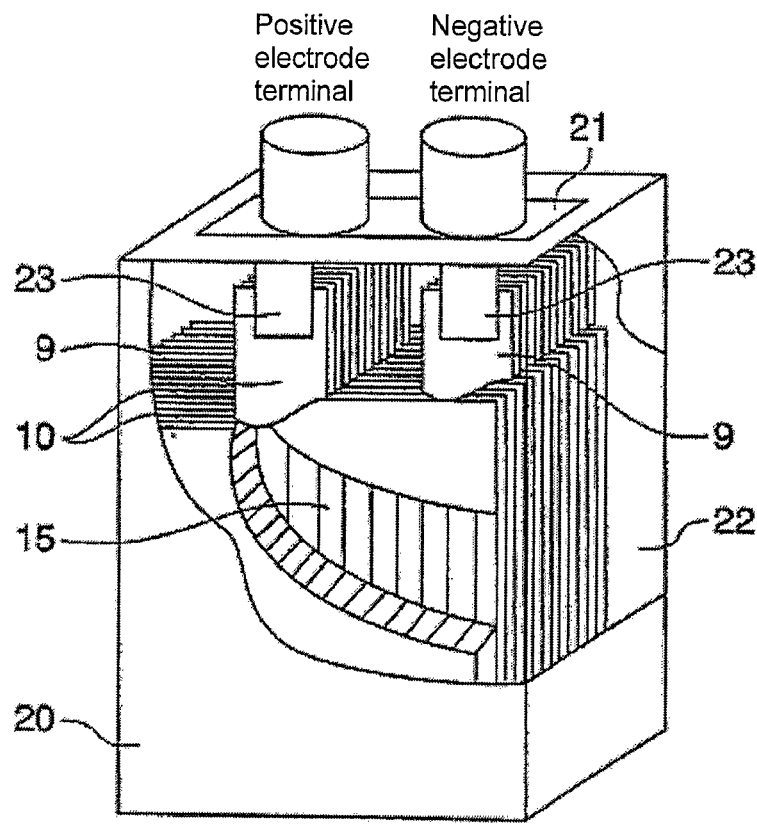
FIG. 6 is a partial cut-away schematic perspective view showing the constitution of an electric double layer capacitor produced in the working examples (example of the present invention)
Figure 7:
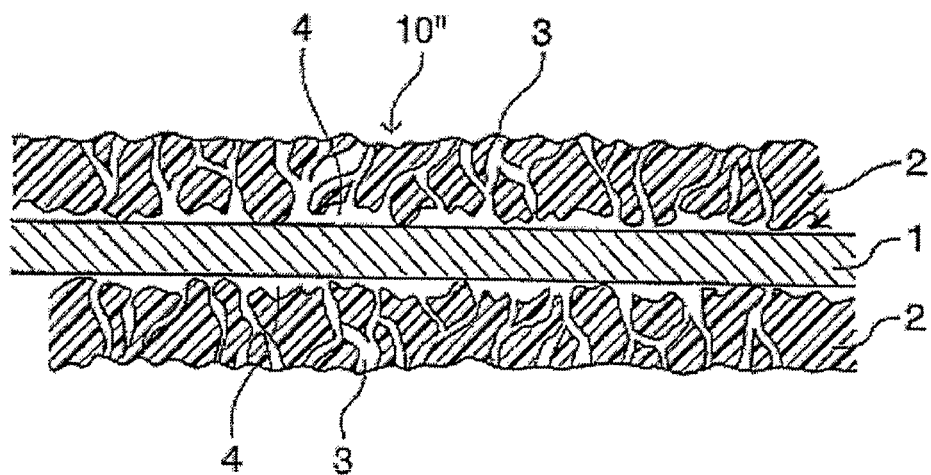
FIG. 7 is a partially enlarged cross-sectional schematic diagram showing the constitution of a conventional electrode for electric double layer capacitors.

The electric double layer capacitor of the present invention is a capacitor that employs the electrode for electric double layer capacitors of the present invention described above. Specifically, as shown in FIG. 4, the electrode 10 of the present invention and a separator 15 are assembled alternately, and these types of assemblies are then arranged next to each other (FIG. 5). Electrolyte is then loaded between the electrode 10 and separator 15, and, normally, the capacitor is housed in a case (e.g., a metal case) (FIG. 6). In FIG. 6, 20 denotes a case, 21 denotes a lid, 22 denotes the electrolyte, and 23 denotes a collector lead.

Well-known separators that are commonly used in electric double layer capacitors may be used as the separator. Examples include PTFE, polypropylene and other porous sheets that have been hydrophilicized, or porous sheets that are obtained from sisal.

In addition, well-known electrolytes that are commonly used in electric double layer capacitors may be used as the electrolyte. Examples of solvents for the electrolyte include carbonate esters such as propylene carbonate or butylene carbonate; lactones such as β-butyrolactone or γ-butyrolactone; sulfolane; amide-based solvents such as dimethyl formamide; nitromethane; 1,2-dimethoxyethane; and acetonitrile. In addition, examples of electrolyte substances used in the electrolyte include acids such as tetrafluoroboric acid, hexafluorophosphoric acid, hexafluoroformic acid, hexafluoroantimonic acid, trifluoroalkylsulfonic acid and other fluorine-containing acids, and perchloric acid, tetrachloroaluminic acid and other chlorine-containing acids; alkali metal salts of these acids (e.g., sodium salts and potassium salts); alkaline-earth metal salts of these acids (e.g., magnesium salts and calcium salts); ammonium salts; tetralkylammonium salts (e.g., tetramethylammonium salts and tetraethylammonium salts); and tetrakylphosphonium salts (e.g., tetramethylphosphonium salts and tetraethylphosphonium salts).

In FIG. 4, the symbol 9 indicates a collector terminal attached to the collector, with a collector lead (not shown) being attached to this collector terminal 9. FIGS. 4 and 5 show examples in which an electrode having the structure presented in FIG. 1 is used, but these electrodes may also be electrodes having the structures shown in FIG. 2 and FIG. 3. In addition, the electrodes that are arranged up next to each other may all have the same structure, or electrodes with different structures may also be placed next to each other. Of the multiple electrodes that are placed next to each other, those that are placed at the ends, as shown in FIG. 5, may be electrodes produced by the lamination of a polarizable porous sheet only to one side of the collector.

<Effect of the Invention>

Employed in the electric double layer capacitor of the present invention are electrodes achieving a reduction in internal resistance relative to conventional electrodes. Consequently, the capacitor yields reduced internal resistance, high electric capacity, and high power density.

The electrode for electric double layer capacitors of the present invention employs the specific constitution described above for the conductive intermediate layer that is interposed between the collector and the polarizable porous sheet, and thus has dramatically reduced internal resistance, exceptional durability (heat-resistant adhesion), and exceptional joining strength between the collector and the polarizable porous sheet. In addition, because the joining strength of the collector and the polarizable porous sheet is high, long electrodes can be produced, and it is possible to store and transport the capacitors with the electrodes wound as rolls. As a result, the electrodes also have exceptional characteristics from the standpoint of production, storage and transport.

The conductive adhesive of the present invention is an adhesive that is desirable for the production of the electrode for electric double layer capacitors of the present invention.

Employed in the electric double layer capacitor of the present invention is an electrode that achieves a reduction in internal resistance, and thus the capacitor can achieve low internal resistance, high electric capacity and high power density.

EMBODIMENTS

The present invention is described in detail below based on working examples. The following working examples do not restrict the present invention, and modifications that do not supersede the main points of the present invention described previously or below are entirely within the technological scope of the present invention.

Working Example 1

[Polarizable Porous Sheet]

100 mass parts of ethanol was added to a mixture composed of 85 mass parts of activated charcoal powder (RP-20, manufactured by Kuraray Chemical; specific surface area 2000 $m^2/g$, average particle diameter 8 μm), 7 mass parts of Ketjen Black (EC600 JD, manufactured by Ketjen Black International) and 8 mass parts of PTFE powder. The material was kneaded and subjected to rolling using rolls, resulting in a long polarizable porous sheet with a width of 100 mm, a thickness of 0.3 mm, a porosity of 65%, and an average pore diameter of 0.8 μm.

[Collector]

High-purity etched aluminum foil (C513, manufactured by KDK) having a width of 150 mm and a thickness of 50 µm was used.

[Conductive Adhesive]

Natural scale-like graphite with an ash content of 0.02% and an average particle diameter of 4 µm and acetylene black with an ash content of 0.02% and an average particle diameter (primary particle diameter) of 35 nm (Denka Black, manufactured by Denki Kagaku Kogyo) were used as carbon materials. In addition, SBR latex (grade 0850, manufactured by JSR) was used as the synthetic rubber. These materials were mixed as indicated by the compositions shown in Table 1 to obtain a conductive adhesive.

[Electrode Production]

The conductive adhesive was applied to both surfaces of the collector using an application roll. The applied amount was 30 g/m$^2$ (amount after drying: 7 g/m$^2$) for each surface. After application, the long polarizable porous sheet was placed on the surfaces of the collector having conductive adhesive (both surfaces), and a laminated sheet was produced by passing the material through compression rolls (clearance: 70%). This laminated sheet was then passed through the interior of a continuous hot air dryer set to a temperature of 150° C. for a period of 3 min, thereby removing the dispersion medium from the conductive adhesive and producing a long electrode.

[Electric Double Layer Capacitor Production]

Multiple 10-cm square electrodes were punched out of the above long electrode, and 2 cm×10 cm collector terminals were attached to the collectors of each of the electrodes by means of welding. Subsequently, assemblies produced by assembling these electrodes were superposed in a group of 15 using separators as shown in FIG. 4. Separators produced by subjecting a drawn porous PTFE film to a hydrophilization treatment (BSP0102560-2, manufactured by Japan Gore-Tex; thickness: 25 µm, porosity: 60%) were used for the separators. After vacuum-drying the capacitors for 72 hr at 150° C., the capacitors were housed in aluminum cases and collector leads were attached to each of the collector terminals. Positive electrode terminals and negative electrode terminals were also attached to the collector leads. Next, a propylene carbonate solution of tetraethylammonium tetrafluoroborate (concentration: 1 mol/L) was loaded into the cases as electrolyte, and the lids were attached to seal the cases, resulting in square electric double layer capacitors.

The above electrodes and electric double layer capacitors were subjected to the following evaluations. The results are presented in Tables 2 and 3.

<Tape Peel Test (Heat Resistance Test)>

After drying the above electrode at a prescribed temperature for 24 h, cross-hatches were made in the form of a checkerboard over part of the polarizable porous sheet (squares of 5×5 mm, 144 squares), and adhesive tape (Danpron Ace II, manufactured by Nitto Denko) was affixed to the surface on which the cut squares were present. The tape was pressed firmly with finger pressure to remove air bubbles between the adhesive tape and polarizable porous sheet, and the tape was then peeled off. Peeling of the polarizable porous sheet sections was checked.

<Specific Capacitance>

10 cycles were continuously carried out with each cycle consisting of a process in which the above electric double layer capacitor was charged for 1500 sec at 10 mA/cm$^2$ and 2.7 V, and then discharged to 0 V at 10 mA/cm$^2$. The discharge curve for the 10$^{th}$ cycle from initiation of discharge to 0 V was integrated, and the electrostatic capacity of the electric double layer capacitor was determined over the charging time of the 10$^{th}$ cycle. This value was then divided by the electrode volume to calculate the specific capacitance.

<DC Internal Resistance>

The value was determined by calculation using the formula V=IR at the time of measurement of specific capacitance described above.

<High-Temperature Durability Testing>

A procedure in which the above electric double layer capacitor was charged for 100 h at 10 mA/cm$^2$ and 2.7 V at a temperature of 70° C., followed by discharging to 0 V at 10 mA/cm$^2$ was taken as one cycle, and this procedure was repeated. The electrostatic capacity was determined by the above method used for determining specific capacitance on the first cycle and after 1000 hr had passed. The results were evaluated in terms of retention of electrostatic capacity after the passage of 1000 hr relative to the value at the start of measurement (1$^{st}$ cycle) [100×(electrostatic capacity of the cycle occurring after 1000 hr had passed)/(electrostatic capacity of the 1$^{st}$ cycle) (%)]

Working Example 2

With the exception that the constitution of the conductive adhesive was changed as indicated in Table 1, an electrode and electric double layer capacitor were produced in the same manner as in Working Example 1, and evaluations were carried out. The SBR latex used in Working Example 2 was Grade 0597C manufactured by JSR. The results are presented in Tables 2 and 3.

Working Example 3

With the exception that the constitution of the conductive adhesive was changed as indicated in Table 1, an electrode and electric double layer capacitor were produced in the same manner as in Working Example 1, and evaluations were carried out. The SBR latex used in Working Example 3 was Grade 0668, manufactured by JSR. The results are presented in Tables 2 and 3.

Working Example 4

With the exception that the constitution of the conductive adhesive was changed as indicated in Table 1, an electrode and electric double layer capacitor were produced in the same manner as in Working Example 1, and evaluations were carried out. The results are presented in Tables 2 and 3.

Working Example 5

With the exception that the constitution of the conductive adhesive was changed as indicated in Table 1, an electrode and electric double layer capacitor were produced in the same manner as in Working Example 1, and evaluations were carried out. The carbon materials used in Working Example 5 were natural scale-like graphite with an ash content of 0.05% and an average particle diameter of 10 µm (Graphite Powder, manufactured by Hitachi Powdered Metals) and acetylene black with an ash content of 0.02% and an average particle diameter (primary particle diameter) of 35 nm (Denka Black, manufactured by Denki Kagaku Kogyo). The results are presented in Tables 2 and 3.

Working Example 6

With the exception that the constitution of the conductive adhesive was changed as indicated in Table 1, an electrode and electric double layer capacitor were produced in the same manner as in Working Example 1, and evaluations were carried out. The results are presented in Tables 2 and 3.

Working Example 7

With the exception that the constitution of the conductive adhesive was changed as indicated in Table 1, an electrode and electric double layer capacitor were produced in the same manner as in Working Example 1, and evaluations were carried out. The results are presented in Tables 2 and 3.

Comparative Example 1

With the exception that only acetylene black with an average particle diameter of 2 μm (Denka Black, manufactured by Denki Kagaku Kogyo) was used as the carbon material in the conductive adhesive, an electrode and electric double layer capacitor were produced in the same manner as in Working Example 1, and evaluations were carried out. The content of acetylene black was 20 mass % with respect to the entire amount of conductive adhesive. The results are presented in Tables 2 and 3.

Comparative Example 2

With the exception that carboxymethylcellulose (CMC Daicel, manufactured by Daicel Chemical Industries) was used instead of synthetic rubber (SBR) and natural scale-like graphite with an average particle diameter of 4 μm was used as the carbon material in the conductive adhesive, an electrode and electric double layer capacitor were produced in the same manner as in Working Example 1, and evaluations were carried out. The content of scale-like graphite was 20 mass % with respect to the entire amount of conductive adhesive. The results are presented in Tables 2 and 3. Comparative Example 1 corresponds to a working example in JP (Kokai) 11-154630.

Comparative Example 3

With the exception that thermosetting polyimide (U-Varnish, manufactured by Ube Industries) was used instead of synthetic rubber (SBR) and natural scale-like graphite with an average particle diameter of 4 μm was used as the carbon material in the conductive adhesive, an electrode and electric double layer capacitor were produced in the same manner as in Working Example 1, and evaluations were carried out. The content of scale-like graphite was 20 mass % with respect to the entire amount of conductive adhesive. The results are presented in Tables 2 and 3.

TABLE 1

| | Synthetic rubber | | | | Carbon material | | | | | |
| | | | | | Scale-like graphite | | | Acetylene black | | |
| | Type | Tg (° C.) | Average particle diameter (nm) | Content (mass %) | Ash content (%) | Average particle diameter (μm) | Content with respect to entire amount of carbon material (mass %) | Ash content (%) | Average particle diameter of primary particles (nm) | Content with respect to entire amount of carbon material (mass %) | Content (%) |
|---|---|---|---|---|---|---|---|---|---|---|---|
| Working Example 1 | SBR | 7 | 135 | 3 | 0.02 | 4 | 75 | 0.02 | 35 | 25 | 20 |
| Working Example 2 | SBR | 28 | 125 | 3 | 0.02 | 4 | 75 | 0.02 | 35 | 25 | 20 |
| Working Example 3 | SBR | −4 | 180 | 3 | 0.02 | 4 | 75 | 0.02 | 35 | 25 | 20 |
| Working Example 4 | SBR | 7 | 135 | 7 | 0.02 | 4 | 75 | 0.02 | 35 | 25 | 20 |
| Working Example 5 | SBR | 7 | 135 | 3 | 0.05 | 10 | 75 | 0.02 | 35 | 25 | 20 |
| Working Example 6 | SBR | 7 | 135 | 3 | 0.02 | 4 | 75 | 0.02 | 35 | 25 | 10 |
| Working Example 7 | SBR | 7 | 135 | 3 | 0.02 | 4 | 75 | 0.02 | 35 | 25 | 30 |

TABLE 2

| | Tape peel test drying temperature (° C.) | | |
|---|---|---|---|
| | 150 | 200 | 230 |
| Working Example 1 | No peeling | No peeling | No peeling |
| Working Example 2 | No peeling | No peeling | No peeling |
| Working Example 3 | No peeling | No peeling | No peeling |
| Working Example 4 | No peeling | No peeling | No peeling |
| Working Example 5 | No peeling | No peeling | No peeling |
| Working Example 6 | No peeling | No peeling | No peeling |
| Working Example 7 | No peeling | No peeling | No peeling |
| Comparative Example 1 | No peeling | No peeling | Partial peeling |
| Comparative Example 2 | No peeling | Partial peeling | Complete peeling |
| Comparative Example 3 | No peeling | No peeling | No peeling |

TABLE 3

| | Specific capacitance (F/cm³) | DC internal resistance (Ω) | High-temperature durability testing (%) |
|---|---|---|---|
| Working Example 1 | 17.0 | 1.0 | 90 |
| Working Example 2 | 16.8 | 1.1 | 90 |
| Working Example 3 | 16.0 | 1.2 | 88 |
| Working Example 4 | 16.2 | 1.4 | 89 |
| Working Example 5 | 16.9 | 1.2 | 85 |
| Working Example 6 | 17.0 | 1.4 | 86 |
| Working Example 7 | 17.0 | 1.0 | 85 |
| Comparative Example 1 | 16.6 | 2.0 | 85 |
| Comparative Example 2 | 16.6 | 1.1 | 78 |
| Comparative Example 3 | 16.7 | 2.2 | 85 |

The invention claimed is:

1. An electrode for electric double layer capacitors comprising a polarizable porous sheet comprising conductive materials including a carbonaceous electric double layer forming material, a carbon material for ensuring conductivity, and a binder integrated via a conductive intermediate layer on at least one surface of a collector;
wherein the conductive intermediate layer contains synthetic rubber and two or more carbon materials having different particle diameters,
the carbon materials having different particle diameters in the conductive intermediate layer are a carbon black and a platelet-like graphite having larger particle diameter than that of the carbon black, and
the mixing ratio of the carbon black and platelet-like graphite is 1:3 to 1:2 based on weight ratio.

2. The electrode for electric double layer capacitors according to claim 1, wherein the synthetic rubber of the conductive intermediate layer is styrene-butadiene rubber.

3. The electrode for electric double layer capacitors according to claim 2, wherein the styrene-butadiene rubber has a glass transition temperature of −5 to 30° C.

4. The electrode for electric double layer capacitors according to claim 1, wherein the conductive intermediate layer is formed using a conductive adhesive containing the carbon material, the synthetic rubber, and a dispersion medium; and the entire amount of carbon material is 3 to 30 mass % in the conductive adhesive.

5. The electrode for electric double layer capacitors according to claim 4, wherein the synthetic rubber is 7 mass % or less in the conductive adhesive.

6. The electrode for electric double layer capacitors according to claim 1, wherein the polarizable porous sheet has an average pore diameter of 0.1 to 5 µm and a porosity of 40 to 90%.

7. The electrode for electric double layer capacitors according to claim 1, wherein the collector is composed of aluminum.

8. The electrode for electric double layer capacitors according to claim 1, wherein the collector has been subjected to a surface roughening treatment.

9. An electric double layer capacitor characterized by having the electrode for electric double layer capacitors according to claim 1.

10. A method for manufacturing an electrode for electric double layer capacitors, characterized in that a conductive adhesive (C) containing a synthetic rubber, two or more types of carbon material having different particle diameters, and a dispersion medium is applied to a joining surface of a collector (B) and/or a polarizable porous sheet (A) comprising constituent materials including a carbonaceous electric double layer forming material, a carbon material for ensuring conductivity, and an adhesive; and, before the dispersion medium dries, the collector and polarizable porous sheet are glued together and compressed, thereby causing part of the nonvolatile component of the conductive adhesive to be pressed into the holes of the polarizable porous sheet,
wherein the carbon materials having different particle diameters in the conductive adhesive (C) are a carbon black and a platelet-like graphite, and
the mixing ratio of the carbon black and plate-like graphite is 1:3 to 1:2 based on weight ratio.

11. A conductive adhesive for forming a conductive intermediate layer used in an electrode for electric double layer capacitors obtained by integrating a polarizable porous sheet, which comprises constituent materials including a carbonaceous electric double layer forming material, a carbon material for ensuring conductivity, and a binder, onto at least one surface of a collector via the conductive intermediate layer; with the conductive adhesive being characterized by containing two or more types of carbon material having different particle diameters, a synthetic rubber, and a dispersion medium,
wherein the carbon materials having different particle diameters in the conductive adhesive are a carbon black and a platelet-like graphite, and
the mixing ratio of the carbon black and plate-like graphite is 1:3 to 1:2 based on weight ratio.

12. The conductive adhesive according to claim 11, wherein the synthetic rubber is styrene-butadiene rubber.

13. The conductive adhesive according to claim 12, wherein the styrene-butadiene rubber has a glass transition temperature of −5 to 30° C.

14. The conductive adhesive according to claim 11, wherein the total of the carbon material in the conductive adhesive is 3 to 30 mass %.

15. The conductive adhesive according to claim 14, wherein the synthetic rubber is 7 mass % or less in the conductive adhesive.

* * * * *

UNITED STATES PATENT AND TRADEMARK OFFICE
CERTIFICATE OF CORRECTION

PATENT NO.        : 7,486,497 B2
APPLICATION NO.   : 10/575344
DATED             : February 3, 2009
INVENTOR(S)       : Kotaro Kobayashi et al.

It is certified that error appears in the above-identified patent and that said Letters Patent is hereby corrected as shown below:

On the title page, item (75) Inventors:--Please change the third inventor name "Shin-ichi Tachozono, Tako-machi (JP)" to "Shinichi Tachizono, Tako-machi (JP)".

Signed and Sealed this

Twenty-sixth Day of May, 2009

JOHN DOLL
*Acting Director of the United States Patent and Trademark Office*